(12) United States Patent
Koolen

(10) Patent No.: US 8,378,593 B2
(45) Date of Patent: Feb. 19, 2013

(54) DIMMER JITTER CORRECTION

(75) Inventor: Gert-Jan Koolen, Aarle Rixtel (NL)

(73) Assignee: NXP B.V., Eindhoven (NL)

( * ) Notice: Subject to any disclaimer, the term of this patent is extended or adjusted under 35 U.S.C. 154(b) by 294 days.

(21) Appl. No.: 12/738,820

(22) PCT Filed: Oct. 20, 2008

(86) PCT No.: PCT/IB2008/054309
§ 371 (c)(1),
(2), (4) Date: Apr. 19, 2010

(87) PCT Pub. No.: WO2009/053893
PCT Pub. Date: Apr. 30, 2009

(65) Prior Publication Data
US 2010/0213870 A1     Aug. 26, 2010

(30) Foreign Application Priority Data

Oct. 22, 2007  (EP) .................................... 07118977

(51) Int. Cl.
*H05B 37/02*    (2006.01)
(52) U.S. Cl. ........................ 315/308; 315/360
(58) Field of Classification Search .............. 315/194, 315/291, 307, 308, 360
See application file for complete search history.

(56) References Cited

U.S. PATENT DOCUMENTS

| | | | | |
|---|---|---|---|---|
| 6,870,327 B2 * | 3/2005 | Takahashi et al. | ............ | 315/248 |
| 6,998,792 B2 * | 2/2006 | Takahashi et al. | ............ | 315/248 |
| 7,656,103 B2 * | 2/2010 | Shteynberg et al. | ........... | 315/312 |
| 7,667,408 B2 * | 2/2010 | Melanson et al. | ......... | 315/209 R |
| 7,902,769 B2 * | 3/2011 | Shteynberg et al. | ........... | 315/291 |
| 8,018,171 B1 * | 9/2011 | Melanson et al. | ............ | 315/194 |
| 8,102,167 B2 * | 1/2012 | Irissou et al. | ................. | 323/300 |
| 2004/0085030 A1 | 5/2004 | LaFlamme et al. | | |
| 2005/0253533 A1 | 11/2005 | Lys et al. | | |
| 2006/0193131 A1 | 8/2006 | McGrath et al. | | |
| 2006/0208667 A1 | 9/2006 | Lys et al. | | |
| 2007/0086199 A1 | 4/2007 | Demarest et al. | | |
| 2007/0182338 A1 | 8/2007 | Shteynberg et al. | | |
| 2007/0182347 A1 | 8/2007 | Shteynberg et al. | | |
| 2008/0180036 A1 | 7/2008 | Garrity et al. | | |
| 2011/0095691 A1 * | 4/2011 | Nakajo et al. | ................. | 315/133 |

FOREIGN PATENT DOCUMENTS

| | | |
|---|---|---|
| JP | 2004-093657 A | 3/2004 |
| WO | 2005/115058 A1 | 12/2005 |
| WO | 2008/112733 A2 | 9/2008 |
| WO | 2008/112735 A2 | 9/2008 |

* cited by examiner

*Primary Examiner* — Thuy Vinh Tran

(57) ABSTRACT

A controller and a method for controlling lamp drivers such as e.g. LED drivers for lamps having a fast response behavior such as e.g. LED lamps are proposed. They enable to substantially reduce or prevent a visible luminance flicker at such lamps when dimming the lamps with a conventional dimmer such as e.g. a phase cut dimmer. This can be achieved by switching off the lamp driver prematurely in such a way that a time jitter of a dimmer switching does not influence an on-time of the lamp driver. No bulky or expensive filters or capacitors are needed. Thus, a space-switch saving and/or inexpensive construction is enabled.

14 Claims, 4 Drawing Sheets

DIMMER JITTER CORRECTION

FIELD OF THE INVENTION

The present invention relates to a controller and method for controlling a lamp driver supplied with an output of a dimmer, which are capable of substantially reducing a visible luminance flicker at lamps having a fast response behavior such as e.g. light-emitting diode (LED) lamps that are dimmed by the dimmer. The invention further relates to an integrated circuit (IC), a lamp driver and a system comprising the controller as well as a computer program product comprising software code portions for performing the steps of the method.

BACKGROUND OF THE INVENTION

Recently LEDs are not only used to indicate a status of some device, to display the time at a digital clock etc. but also for lighting purposes. The latter has been enabled by introducing high output LEDs. Such LEDs can be used e.g. in tail lights, brake lights, turn indicators, side turn indicators and daytime driving lights of a motor vehicle, in pocket lamps or in rooms of a building. They provide various advantages as compared with lamps such as incandescent or luminescent lamps. For example, they can be activated at a higher speed, have a longer service life and take up less space.

When using LED lamps to light a room there may be a need for controlling the intensity of light emitted by LEDs thereof in order to achieve a desired luminance. For LED lamps and other kinds of lamps such control can be accomplished by varying a mean power supplied to the lamps. A device used for this purpose is called a dimmer. Different technologies can be used to implement a dimmer. For example, a potentiometer, a variable transformer, a controllable switching power supply, a phase cut control etc. may be utilized. The phase cut control has a low power loss as compared with the potentiometer and other arrangements based on a variable resistor. Its construction can be smaller and lighter than that of a variable transformer and can be simpler, smaller and less sensitive to breakdowns than that of a controllable switching power supply. For these reasons, phase cut dimmers are widely spread.

There are phase cut-on dimmers in which a leading edge of a waveform of supplied power is cut in order to reduce the mean power. These dimmers ignite (switch on) a certain time period after a zero crossing of the waveform. They are suitable for inductive loads. There are also phase cut-off dimmers in which a trailing edge of the waveform of supplied power is cut in order to reduce the mean power. These dimmers ignite immediately after a zero crossing of the waveform and switch off a certain time period before the next zero crossing. They are suitable for capacitive loads. Further, there are universal dimmers which apply a phase cut-on control for inductive loads and a phase cut-off control for capacitive loads.

LED lamps are much more susceptible to noise on the mains than incandescent lamps or luminescent lamps such as fluorescent lamps. Conventional wall-mount (phase cut) dimmers often introduce extra jitter so that the noise may be visible at the LED lamps. Thus, LED lamps for replacing incandescent or luminescent lamps in mains phase cut dimmer controlled luminaires (i.e. retrofit products) suffer from a visible luminance flicker. Any jitter in an exact location of the phase cut by the dimmer was previously filtered by the slow response of incandescent and luminescent lamps. As the response of LEDs and LED lamps comprising the same is instantaneous, such filtering property is missing. This results in the visible luminance flicker.

FIG. 5 shows an example of typical jitter created by a conventional phase cut dimmer, namely a phase cut-on dimmer. Half of a period of a sine wave representing a mains voltage is depicted. As illustrated in FIG. 5, a time period between a zero crossing of the sine wave and a point in time at which the dimmer ignites is not constant. That is, the dimmer creates jitter, mainly under the influence of mains noise. Consequently, a time period between the point in time at which the dimmer ignites and a next zero crossing of the sine wave is also not constant. As a result, the mean power supplied by the dimmer is not constant. This may cause a visible luminance flicker at LED lamps dimmed by such a dimmer.

A dimmable LED lamp system may comprises the following components: 1) Mains, 2) conventional phase cut dimmer, 3) bridge rectifier, 4) LED driver and 5) LED(s). Such dimmable LED lamp system is likely to produce a visible luminance flicker. The reason for this is that the conventional phase cut dimmer is 'confused' by noise and other signals on the mains. As a result, the dimmer creates jitter as shown in FIG. 5. This is usually not visible at incandescent and luminescent lamps because of their slow response behavior, but may be visible when using LED lamps or other lamps having a fast response behavior.

Different ways for reducing a visible luminance flicker are conceivable. FIG. 6 shows a dimmable LED lamp system according to a first approach for overcoming a jitter problem occurring with a conventional phase cut dimmer. The system comprises mains 61, a conventional phase cut dimmer 62, a bridge rectifier 63, an LED driver 64 and LED(s) 65, wherein only a single LED is depicted. In addition, the system includes a low pass filter 66 placed in front of the LED(s) 65. The mains 61 supplies an alternating current (AC) voltage. The mean AC voltage is varied by the dimmer 62 and supplied to the bridge rectifier 63. The bridge rectifier 63 rectifies the AC voltage to a direct current (DC) voltage. The DC voltage is supplied to the LED driver 64. The LED driver 64 drives the LED(s) 65, wherein the low pass filter 66 can filter out high-frequency jitter in an output of the LED driver 64. By this configuration, a visible luminance flicker may be reduced. However, such a low pass filter 66 is bulky (i.e. big) and expensive.

FIG. 7 shows a dimmable LED lamp system according to a second approach for overcoming a jitter problem occurring with a conventional phase cut dimmer. The system comprises mains 71, a conventional phase cut dimmer 72, a bridge rectifier 73, an LED driver 74 and LED(s) 75, wherein only a single LED is depicted. In addition, the system includes a capacitor 76 connected in parallel after the bridge rectifier 73 and a low pass filter 77 interposed between the capacitor 76 and an adjusting input of the LED driver 74. The mains 71 supplies an AC voltage. The mean AC voltage is varied by the dimmer 72 and supplied to the bridge rectifier 73. The bridge rectifier 73 rectifies the AC voltage to a DC voltage. The capacitor 76 is used to stabilize the DC voltage. Thus, the AC voltage is rectified to a stable DC voltage, which is supplied to the LED driver 74. The low pass filter 77 can then be used to filter out a flicker. By this configuration, a visible luminance flicker may be reduced. However, such a capacitor 76 is bulky and expensive.

Since there are no conventionally-dimmable LED lamps on the market, there is very little known on this subject. However, the above described first and second approaches may not be suitable for LED drivers necessitating a space-saving and/or inexpensive construction, such as e.g. LED drivers for retrofit LED lamps intended for replacing incandescent, luminescent or other conventional lamps. This is due to the low pass filter and/or the capacitor being bulky and expensive.

SUMMARY OF THE INVENTION

It would be advantageous to substantially reduce or prevent a visible luminance flicker due to a conventional phase cut dimmer in a dimmable LED lamp system or other lamp system having a fast response behavior, without the need of having bulky and expensive filters or capacitors.

This can be achieved by a controller according to claim 1 and a method according to claim 16.

In a first aspect of the invention a controller for controlling a lamp driver supplied with an output of a dimmer is presented, the controller comprising: enabling means configured to enable the lamp driver at a start time and disable the lamp driver before the end of an active period of the dimmer. According to the first aspect, a visible luminance flicker at a lamp having a fast response behavior can be substantially reduced or prevented, without the need of having bulky capacitors or filters.

In a second aspect of the invention based on the first aspect the enabling means is further configured to disable the lamp driver a first time period after the start time.

According to the second aspect, the lamp driver can be enabled for a constant time independent of an ignition time of the dimmer. Thus, a constant luminance may be achieved.

In a third aspect of the invention based on the first aspect the controller further comprises: first sensing means configured to sense the active period of the dimmer based on the output of the dimmer and transmit a start signal to the enabling means, wherein the enabling means is further configured to enable the lamp driver when receiving the start signal. According to the third aspect, enabling of the lamp driver can be triggered at various points in the active period. Thus, enabling may be delayed if desired.

In a fourth aspect of the invention based on the third aspect the first sensing means is further configured to transmit the start signal at the beginning of the active period. According to the fourth aspect, the lamp driver can be enabled instantaneously when the dimmer switches on. Thus, a regulation range can be maximized.

In a fifth aspect of the invention based on the second aspect the controller further comprises: calculating means configured to calculate a proposed new first time period, wherein the enabling means is further configured to adapt the first time period based on the proposed new first time period. According to the fifth aspect, the first time period can be adapted such that a second time period between the end of the first time period and a point in time at which the mains voltage falls below a certain level may be regulated to a certain reference time period defining a margin for a regulation.

In a sixth aspect of the invention based on the fifth aspect the controller further comprises: second sensing means configured to sense a passive period of the dimmer based on the output of the dimmer and transmit a signal indicating the passive period to the calculating means, wherein the calculating means is further configured to calculate the proposed new first time period based on the signal indicating the passive period and a signal indicating the first time period. According to the sixth aspect, the proposed new first time period can be calculated precisely.

In a seventh aspect of the invention based on the sixth aspect the enabling means is further configured to supply the signal indicating the first time period. According to the seventh aspect, the signal indicating the first time period can be obtained without additional effort.

In an eighth aspect of the invention based on the seventh aspect the calculating means is further configured to determine a second time period between the end of the first time period and a point in time at which a mains voltage of the dimmer falls below a certain level, subtract the determined second time period from a reference time period and integrate a subtraction result to obtain the proposed new first time period. According to the eighth aspect, the proposed new first time period may be obtained without additional components.

In a ninth aspect of the invention based on the sixth aspect the controller further comprises: integrating means configured to integrate an output of the lamp driver and supply the signal indicating the first time period based on an integration result. According to the ninth aspect, the first time period can be determined by an accumulated output energy of the lamp driver. Thus, an improved performance may be achieved when an output of the lamp driver is proportional to an input thereof.

In a tenth aspect of the invention based on the ninth aspect the calculating means is further configured to determine a time between a point in time at which the integration result exceeds a specific threshold and a point in time at which a mains voltage of the dimmer falls below a certain level, subtract the determined time from a reference time period and integrate a subtraction result to obtain the proposed new first time period.

According to the tenth aspect, the first time period can be determined by an accumulated output energy of the lamp driver. Thus, an improved performance may be achieved when an output of the lamp driver is proportional to an input thereof.

In an eleventh aspect of the invention based on the ninth aspect the integrating means is further configured to be reset by the signal indicating the passive period. According to the eleventh aspect, the energy of a current cycle can be integrated easily.

In a twelfth aspect of the invention an integrated circuit is presented in which a controller according to any one of the preceding aspects is integrated. According to the twelfth aspect, a space-saving and inexpensive construction is enabled.

In a thirteenth aspect of the invention a lamp driver comprises: a controller according to one of the first to eleventh aspects, wherein the controller is configured to control the lamp driver. According to the thirteenth aspect, the controller and the lamp driver can be combined so that a space-saving and inexpensive construction is enabled.

In a fourteenth aspect of the invention a system comprises: a dimmer configured to vary a mean power and output the varied mean power, a controller according to any one of the first to eleventh aspects, a lamp driver supplied with the varied mean power, and a lamp, wherein the controller is configured to control the lamp driver and the lamp driver is configured to drive the lamp. According to the fourteenth aspect, a visible luminance flicker at the lamp can be substantially reduced or prevented, without the need of having bulky capacitors or filters.

In a fifteenth aspect of the invention based on the fourteenth aspect the lamp driver of the system is an LED driver and the lamp of the system is an LED lamp comprising LEDs. According to the fifteenth aspect, a lighting system with a fast response behavior can be achieved.

In a sixteenth aspect of the invention a method of controlling a lamp driver supplied with an output of a dimmer is presented, the method comprising: enabling the lamp driver at a start time, and disabling the lamp driver before the end of an active period of the dimmer. According to the sixteenth aspect, a visible luminance flicker at a lamp having a fast response behavior can be substantially reduced or prevented, without the need of having bulky capacitors or filters.

In a seventeenth aspect of the invention a computer program product for a computer comprises software code portions for performing the steps of a method according to the sixteenth aspect when the product is run on the computer. According to the seventeenth aspect, a visible luminance flicker at a lamp having a fast response behavior can be substantially reduced or prevented, without the need of having bulky capacitors or filters.

These and other aspects of the invention will be apparent from and elucidated by embodiments described hereinafter.

BRIEF DESCRIPTION OF THE DRAWINGS

The present invention will now be described on the basis of embodiments with reference to the accompanying drawings, in which.

DETAILED DESCRIPTION OF EMBODIMENTS

Figure 1:
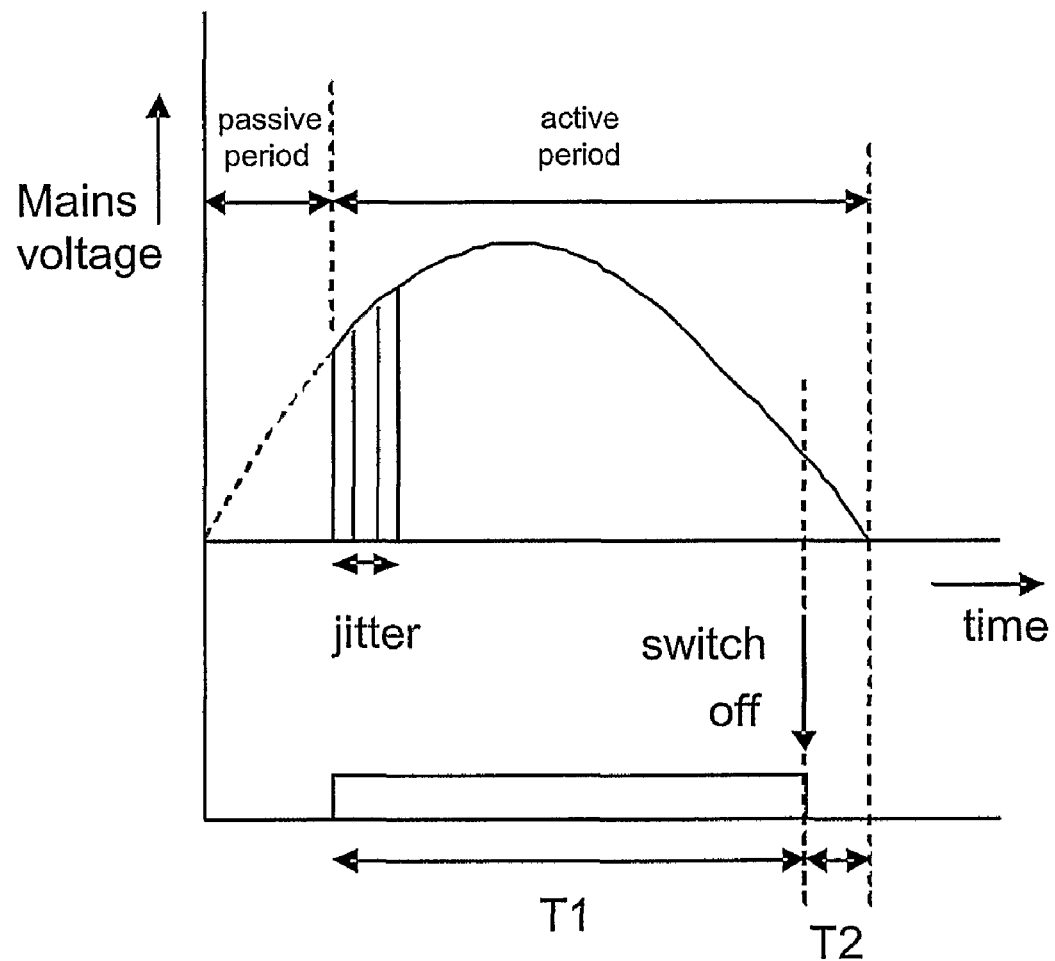
FIG. 1 illustrates the principle of dealing with a jitter problem according to first and second embodiments.

FIG. 1 illustrates the principle of dealing with a jitter problem according to first and second embodiments. The problem can be solved in the time domain: a lamp driver such as e.g. an LED driver may be switched off prematurely in such a way that the on-time of the lamp driver does not depend on a point in time at which a dimmer ignites. That is, when a timing of a dimmer switching varies, this has no influence on a time period during which the lamp driver is enabled. Thus, the on-time of the lamp driver does not depend anymore on the time jitter of the dimmer switching.

In FIG. 1 half of a period of a sine wave representing a mains voltage is depicted. As illustrated in FIG. 1, a time period between a zero crossing of the sine wave and a point in time at which the dimmer ignites (i.e. a passive period of the dimmer in which the dimmer is switched off) is not constant. That is, the dimmer creates jitter, mainly under the influence of mains noise. Consequently, a time period between the point in time at which the dimmer ignites and a next zero crossing of the sine wave (i.e. an active period of the dimmer in which the dimmer is switched on) is also not constant.

The lamp driver can be switched off before the next zero crossing. That is, the lamp driver may be switched off after a first time period T1 (i.e. the on-time of the lamp driver) which is shorter than the time period between the point in time at which the dimmer ignites and the next zero crossing. This first time period T1 is not influenced by the jitter created by the dimmer. Therefore, the mean power supplied by the lamp driver is almost independent of the jitter. It can vary marginally because slightly varying parts of the sine wave may be covered by the first time period T1 due to different start times thereof caused by the jitter. However, a visible luminance flicker at lamps having a fast response behavior and being dimmed by the dimmer can be significantly reduced or prevented.

After switching off, a second time period T2 may be measured as the time between the end of the first time period T1 and a point in time at which the mains voltage falls below a certain level, e.g. zero level. The second time period T2 can then be used to adapt the first time period T1 (slowly) such that the second time period T2 may be regulated to a certain reference time period. This reference time period defines a margin in which a regulation is possible. That is, the margin in which the dimmer jitter can be corrected (i.e. compensated for).

Figure 2:
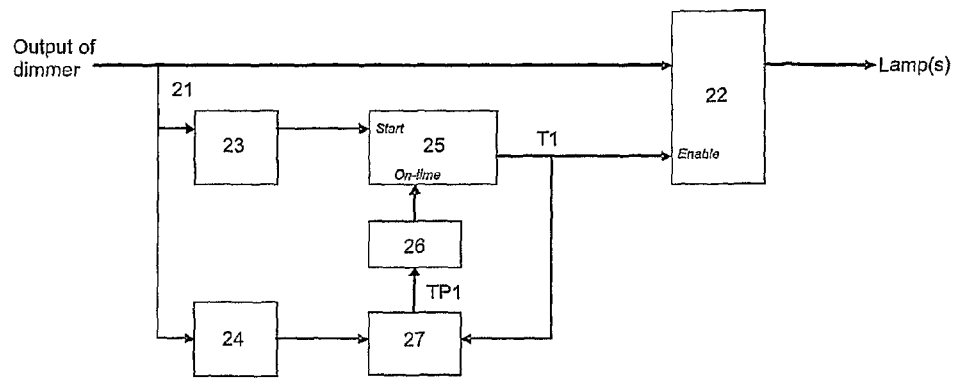
FIG. 2 shows a schematic diagram of an exemplary arrangement according to the first embodiment.

FIG. 2 shows a schematic diagram of an exemplary arrangement according to the first embodiment. This arrangement comprises a controller 21 and a lamp driver 22 such as e.g. an LED driver. An output of a dimmer can be supplied to the controller 21 and the lamp driver 22. The lamp driver 22 may drive one or more lamps such as e.g. LED lamps comprising LED(s).

The controller 21 can implement a phase locked loop (PLL) scheme. It may comprise a first sensing means 23, a second sensing means 24, an enabling means 25 such as e.g. a monostable multivibrator also known as a one shot, a filter 26, and a calculating means 27. The first sensing means 23 can sense the active period (an active mode) of the dimmer based on the output of the dimmer and transmit a start signal to the enabling means 25. The start signal may be transmitted at the beginning of the active period or a certain time after the beginning of the active period (i.e. with a certain delay). The second sensing means 24 can sense the passive period (a passive mode) of the dimmer based on the output of the dimmer and transmit a signal indicating the passive period to the calculating means 27.

The enabling means 25 may enable the lamp driver 22 at a start time. This can be achieved by transmitting an enabling signal to an enable input of the lamp driver 22. The enabling means 25 may enable the lamp driver 22 when receiving at a start input thereof the start signal as transmitted by the first sensing means 23. The enabling means 25 can also disable the lamp driver 22. This may be achieved e.g. by stopping the transmission of the enabling signal. The enabling means 25 can disable the lamp driver 22 the first time period T1 after the start time. The enabling means 25 may adapt the first time period T1 based on a signal received at an on-time input thereof. Such adaptation can be rather slow.

The calculating means 27 may calculate a proposed new first time period TP1, based on the measured second time period T2 compared with a proper reference time period defining a margin for regulation (i.e. based on a time error). The calculating means 27 can e.g. calculate the proposed new first time period TP1 by measuring the second time period T2 as the time between the end of the first time period T1 and a point in time at which the mains voltage falls below a certain level, subtracting the second time period T2 from the reference time period, and integrating a subtraction result to obtain TP1. The second time period T2 may be determined based on the signal indicating the passive period of the dimmer as transmitted by the second sensing means 24 (i.e. a point in time at which the mains voltage falls below a certain level) and a signal indicating the first time period T1 (i.e. the end of the first time period T1). That is, the proposed new first time period TP1 can be calculated based on these signals. The signal indicating the first time period T1 may be supplied by the enabling means 25 and can correspond to the enabling signal. The calculating means 27 may transmit a signal indicating the proposed new first time period TP1. This signal can be filtered by the filter 26. The filter 26 may determine the speed of response in following a dim level. A signal output by the filter 26 can be transmitted to the on-time input of the enabling means 25.

With the above described first embodiment the first time period T1 does not depend on the points in time at which the dimmer switches. It is not influenced by the time jitter of the dimmer switching. The first time period T1 (i.e. the on-time of the lamp driver 22) is rather constant, even if it may be adapted (slowly).

The performance of the above described exemplary arrangement according to the first embodiment depends on the function of the lamp driver 22. If it delivers a constant current independent of an input voltage then the performance will be good. If a current output by the lamp driver 22 is proportional to the input voltage then the second embodiment described in the following can provide a better performance.

Figure 3:
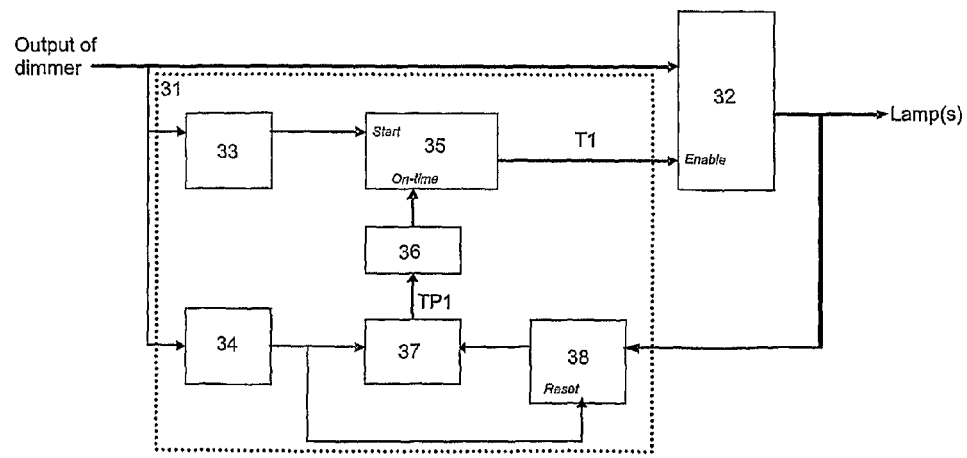
FIG. 3 shows a schematic diagram of an exemplary arrangement according to the second embodiment.

FIG. 3 shows a schematic diagram of an exemplary arrangement according to the second embodiment. This arrangement comprises a controller 31 and a lamp driver 32 such as e.g. an LED driver. An output of a dimmer may be supplied to the controller 31 and the lamp driver 32. The lamp driver 32 can drive one or more lamps such as e.g. LED lamps comprising LED(s).

The controller 31 may comprise a first sensing means 33, a second sensing means 34, an enabling means 35 such as e.g. a monostable multivibrator also known as a one shot, a filter 36, a calculating means 37, and an integrating means 38 such as e.g. an integrator. The first sensing means 33 can sense the active period (the active mode) of the dimmer based on the output of the dimmer and transmit a start signal to the enabling means 35. The start signal may be transmitted at the beginning of the active period or a certain time after the beginning of the active period (i.e. with a certain delay). The second sensing means 34 can sense the passive period (the passive mode) of the dimmer based on the output of the dimmer and transmit a signal indicating the passive period to the calculating means 37.

The enabling means 35 may enable the lamp driver 32 at a start time. This can be achieved by transmitting an enabling signal to an enable input of the lamp driver 32. The enabling means 35 may enable the lamp driver 32 when receiving at a start input thereof the start signal as transmitted by the first sensing means 33. The enabling means 35 can also disable the lamp driver 32. This may be achieved e.g. by stopping the transmission of the enabling signal. The enabling means 35 can disable the lamp driver 32 the first time period T1 after the start time. The enabling means 35 may adapt the first time period T1 based on a signal received at an on-time input thereof.

The calculating means 37 may e.g. calculate a proposed new first time period TP1 by determining a time between a point in time at which an accumulated energy exceeds a specific threshold and a point in time at which the mains voltage falls below a certain level, subtracting the determined time from a proper reference time period, and integrating a subtraction result to obtain TP1. The time can be determined based on the signal indicating the passive period of the dimmer as transmitted by the second sensing means 34 (i.e. a point in time at which the mains voltage falls below a certain level) and a signal indicating the first time period T1 (i.e. the accumulated energy). The signal indicating the first time period T1 may be supplied by the integrating means 38 as described below. The calculating means 37 may transmit a signal indicating the proposed new first time period TP1. This signal can be filtered by the filter 36. The filter 36 may determine the speed of response in following a dim level. A signal output by the filter 36 can be transmitted to the on-time input of the enabling means 35.

The integrating means 38 may integrate an output of the lamp driver 32 such as a current so as to determine an accumulated energy. The accumulated energy can indicate the first time period T1. The integrating means 38 may supply a signal indicating an integration result, i.e. the first time period T1. The integrating means 38 can be reset when receiving a reset signal at a reset input thereof. This reset signal may be the signal indicating the passive period of the dimmer as transmitted by the second sensing means 34. Thus, the integration performed by the integrating means 38 can be reset in the passive period of the dimmer. Hence, the first time period T1 may be determined by the accumulated energy of a current cycle.

With the above described second embodiment the first time period T1 does not depend on the points in time at which the dimmer switches. It is not influenced by the time jitter of the dimmer switching. The first time period T1 (i.e. the on-time of the lamp driver 32) is not a rather constant time as with the first embodiment, but determined by the accumulated energy of the current cycle. This can provide a better performance as compared with the first embodiment if an output such as a current of the lamp driver 32 is proportional to an input such as a voltage. That is, the second embodiment provides an improved approach for dealing with the jitter problem.

With both of the first and second embodiments the controller 21, 31 can be easily integrated in an integrated circuit as no bulky filters or capacitors are needed. Further, even though the controller 21, 31 and the lamp driver 22, 32 are depicted as separate units in each of FIG. 2 and FIG. 3, the controller 21, 31 may also be included in the lamp driver 22, 32.

Both of these alternatives can help in designing a space-saving and/or inexpensive construction.

The first and second embodiments can be implemented in a method of controlling a lamp driver. The steps of such method can be performed by software code portions of a computer program product for a computer when the product is run on the computer.

Figure 4:
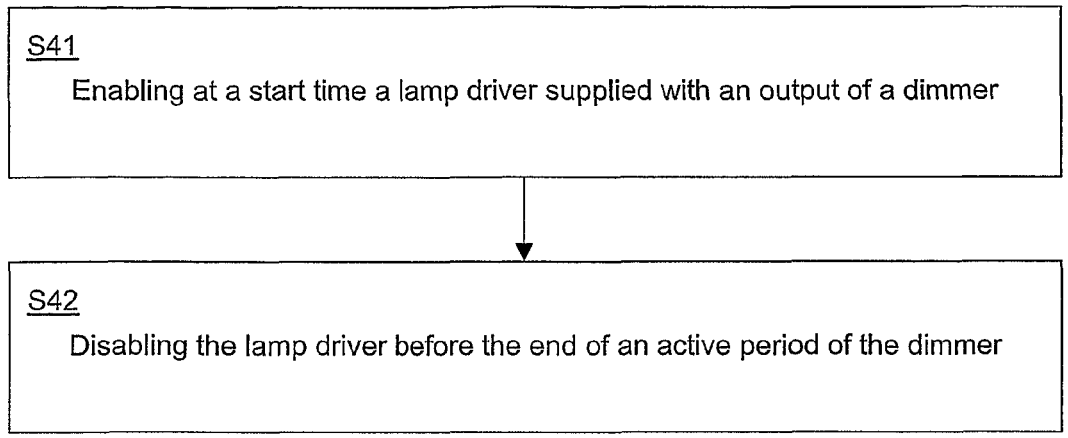
FIG. 4 shows a flow chart illustrating basic steps of an exemplary method according to the first and second embodiments.
Figure 5:
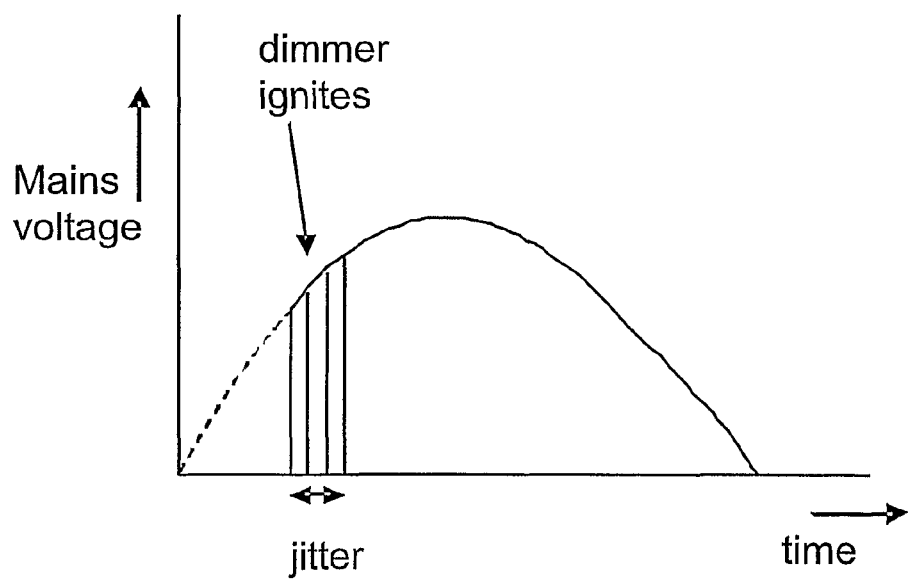
FIG. 5 shows an example of typical jitter created by a conventional phase cut dimmer.

FIG. 4 shows a flow chart illustrating basic steps of an exemplary method according to the first and second embodiments. In a step S41 a lamp driver supplied with an output of a dimmer is enabled at a start time. In a step S42 the lamp driver is disabled before the end of an active period of the dimmer.

Figure 6:
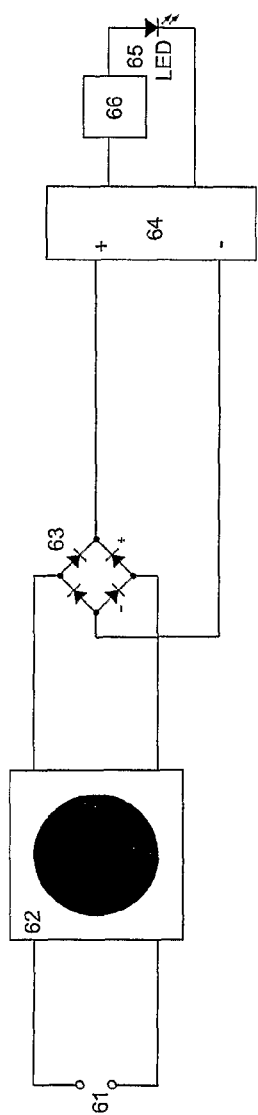
FIG. 6 shows a dimmable LED lamp system according to a first approach for overcoming a jitter problem occurring with a conventional phase cut dimmer.
Figure 7:
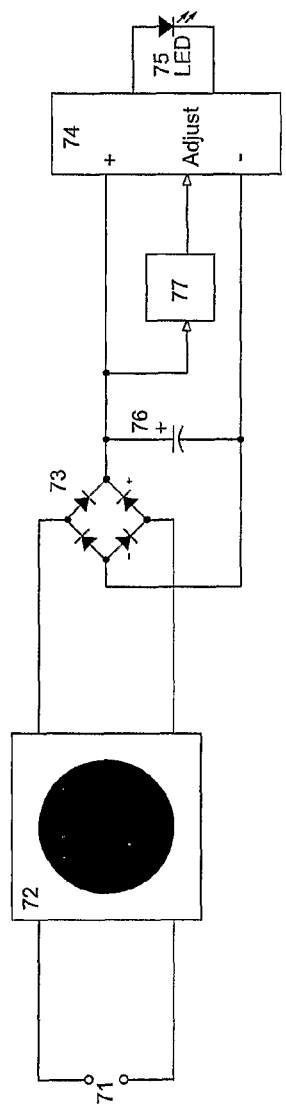
FIG. 7 shows a dimmable LED lamp system according to a second approach for overcoming a jitter problem occurring with a conventional phase cut dimmer.

A controller according to the first or second embodiment can be part of a system comprising a dimmer configured to vary a mean power and output the varied mean power, a lamp driver supplied with the varied mean power, and a lamp, wherein the controller may control the lamp driver and the lamp driver may drive the lamp. Such system may be obtained e.g. when starting from a system as illustrated in FIG. 6, dispensing with the low pass filter 66 and placing the controller in front of the LED driver 64.

Both of the above described first and second embodiments are capable of substantially reducing or preventing a visible luminance flicker at lamps having a fast response behavior such as e.g. LED lamps when dimming such lamps with a conventional dimmer such as e.g. a phase cut dimmer. That is, they can be used for lamp drivers such as e.g. LED drivers which must be able to be used with a conventional dimmer.

For example, LED drivers to be used with retrofit LED lamps intended for replacing incandescent, luminescent or other conventional lamps.

Further, the first and second embodiments do not require bulky or expensive filters or capacitors to substantially reduce or prevent a visible luminance flicker. Thus, they are suitable for space-saving and/or inexpensive constructions, such as e.g. LED drivers for retrofit LED lamps intended for replacing incandescent, luminescent or other conventional lamps.

While the invention has been illustrated and described in detail in the drawings and the foregoing description, such illustration and description are to be considered illustrative or exemplary and not restrictive. The invention is not limited to the disclosed embodiments.

Variations to the disclosed embodiments can be understood and effected by those skilled in the art, from a study of the drawings, the disclosure and the appended claims.

In the claims, the word "comprising" does not exclude other elements or steps, and the indefinite article "a" or "an" does not exclude a plurality of elements or steps. A single processor or other unit may fulfill the functions of several items recited in the claims.

The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

In summary, a controller and a method for controlling lamp drivers such as e.g. LED drivers for lamps having a fast response behavior such as e.g. LED lamps are proposed. They enable to substantially reduce or prevent a visible luminance flicker at such lamps when dimming the lamps with a conventional dimmer such as e.g. a phase cut dimmer. This can be achieved by switching off the lamp driver prematurely in such a way that a time jitter of a dimmer switching does not influence an on-time of the lamp driver. No bulky or expensive filters or capacitors are needed. Thus, a space-saving and/or inexpensive construction is enabled.

The invention claimed is:

1. A controller for controlling a lamp driver supplied with an output of a dimmer, said controller comprising:
   enabling element configured to enable said lamp driver at a start time and disable said lamp driver before the end of an active period of said dimmer;
   wherein said enabling element is further configured to disable said lamp driver a first time period after said start time; and
   further comprising:
   calculating element configured to calculate a proposed new first time period, wherein said enabling element is further configured to adapt said first time period based on said proposed new first time period;
   a sensing element configured to sense a passive period of said dimmer based on said output of said dimmer and transmit a signal indicating said passive period to said calculating element, wherein said calculating element is further configured to calculate said proposed new first time period based on said signal indicating said passive period and a signal indicating said first time period;
   wherein said enabling element is further configured to supply said signal indicating said first time period; and
   wherein said calculating element is further configured to determine a second time period between the end of said first time period and a point in time at which a mains voltage of said dimmer falls below a certain level, subtract said determined second time period from a reference time period and integrate a subtraction result to obtain said proposed new first time period.

2. A controller according to claim 1, further comprising:
   a second sensing element configured to sense said active period of said dimmer based on said output of said dimmer and transmit a start signal to said enabling element, wherein said enabling element is further configured to enable said lamp driver when receiving said start signal.

3. A controller according to claim 2, wherein said second sensing element is further configured to transmit said start signal at the beginning of said active period.

4. A controller according to claim 1, further comprising:
   integrating element configured to integrate an output of said lamp driver and supply said signal indicating said first time period based on an integration result.

5. A controller according to claim 4, wherein said calculating element is further configured to determine a time between a point in time at which said integration result exceeds a specific threshold and a point in time at which a mains voltage of said dimmer falls below a certain level, subtract said determined time from a reference time period and integrate a subtraction result to obtain said proposed new first time period.

6. A controller according to claim 4, wherein said integrating element is further configured to be reset by said signal indicating said passive period.

7. An integrated circuit in which the controller according to claim 1 is integrated.

8. A lamp driver comprising:
   the controller according to claim 1, wherein said controller is configured to control said lamp driver.

9. A system comprising:
   a dimmer configured to vary a mean power and output said varied mean power;
   the controller according to claim 1;
   a lamp driver supplied with said varied mean power; and
   a lamp,
   wherein said controller is configured to control said lamp driver and said lamp driver is configured to drive said lamp.

10. A system according to claim 9, wherein said lamp driver is an LED driver and said lamp is an LED lamp comprising LEDs.

11. A method of controlling a lamp driver supplied with an output of a dimmer, said method comprising:
   enabling said lamp driver at a start time; and
   disabling said lamp driver before the end of an active period of said dimmer;
   wherein disabling said lamp driver before the end of an active period of said dimmer comprises disabling said lamp driver a first time period after said start time; and
   further comprising calculating a proposed new first time period and adapting said first time period based on said proposed new first time period;
   sensing a passive period of said dimmer based on said output of said dimmer;
   calculating said proposed new first time period based on said signal indicating said passive period and a signal indicating said first time period; and
   integrating an output of said lamp driver to produce an integration result; and adapting said first time period based on the integration result.

12. A controller for controlling a lamp driver supplied with an output of a dimmer, said controller comprising:

enabling element configured to enable said lamp driver at a start time and disable said lamp driver before the end of an active period of said dimmer;

wherein said enabling element is further configured to disable said lamp driver a first time period after said start time; and further comprising:

calculating element configured to calculate a proposed new first time period, wherein said enabling element is further configured to adapt said first time period based on said proposed new first time period;

a sensing element configured to sense a passive period of said dimmer based on said output of said dimmer and transmit a signal indicating said passive period to said calculating element, wherein said calculating element is further configured to calculate said proposed new first time period based on said signal indicating said passive period and a signal indicating said first time period; and an integrating element configured to integrate an output of said lamp driver and supply said signal indicating said first time period based on an integration result.

13. A controller according to claim 12, wherein said calculating element is further configured to determine a time between a point in time at which said integration result exceeds a specific threshold and a point in time at which a mains voltage of said dimmer falls below a certain level, subtract said determined time from a reference time period and integrate a subtraction result to obtain said proposed new first time period.

14. A controller according to claim 12, wherein said integrating element is further configured to be reset by said signal indicating said passive period.

* * * * *